May 2, 1967
J. N. MASON ETAL
3,316,673
HORTICULTURAL SYSTEM
Filed Jan. 21, 1966
2 Sheets-Sheet 1
FIG. 1
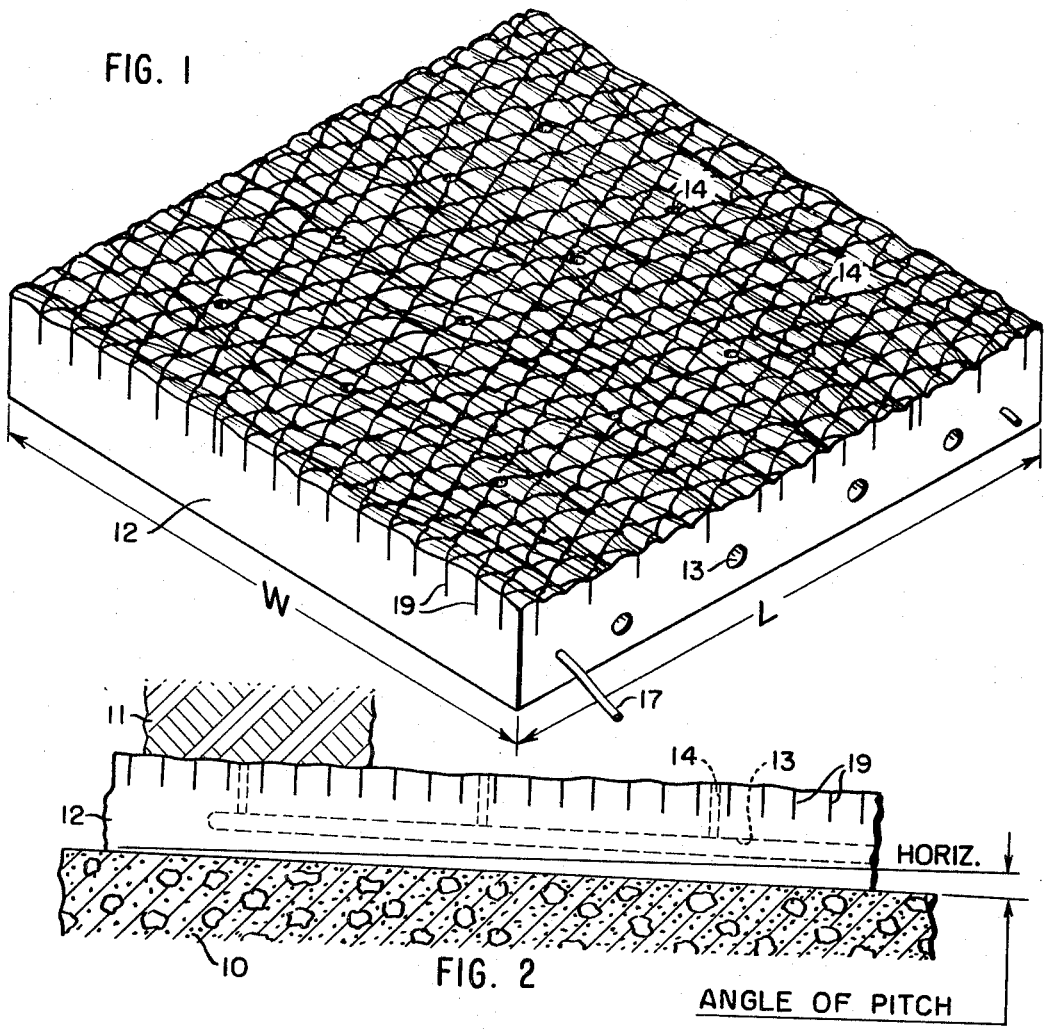
FIG. 2
FIG. 3
INVENTORS
JAMES N. MASON
EDWARD M. ROTHERMEL
BY
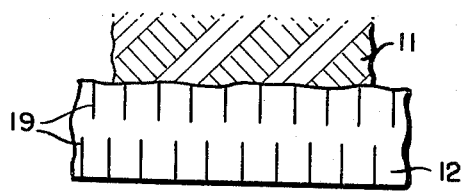
Attys.

United States Patent Office 3,316,673
Patented May 2, 1967

3,316,673
HORTICULTURAL SYSTEM
James N. Mason and Edward M. Rothermel, Winchester, Mass., assignors to American Biltrite Rubber Co., Inc., Chelsea, Mass., a corporation of Delaware
Filed Jan. 21, 1966, Ser. No. 522,289
6 Claims. (Cl. 47—1)

This invention comprises a new and improved process of controlling the temperature, moisture and fertilization of agricultural soil, and includes within its scope the underlying system herein disclosed for carrying out the said process.

The productivity of most farm and garden acres is seriously impaired in all years by unfavorable growing conditions of one sort or another. The object of the present invention is to provide areas which shall be free of frost and maintained at optimum temperature for their specific crop, supplied with the optimum amount of moisture and adapted for convenient treatment by fertilizer in liquid form.

To this end we first propose a solid underlying foundation layer of clay, hard-pan, asphalt or the like. Upon this is laid a continuous ply of tough elastomeric material containing certain sub-surface ducts and embedded heating units, and upon this is spread a layer of loam or garden soil. The elastomeric ply is provided internally with a network of small ducts or passages to which water or fertilizer in solution may be supplied for circulation in selected areas and for discharge in measured amount into the supernatant soil. Preferably the water passages may be cut into elastomeric slabs or sheets by using withdrawable mandrels, the passages being located where they can be conveniently tapped to receive water or liquid fertilizer and perforated to discharge it into the adjacent soil.

The electric heating units are distributed throughout the elastomeric ply and are regulated to maintain by conduction the temperature of the ply and soil thereon.

The elastomeric ply may advantageously be provided with a corrugated or recessed surface which tends to hold the soil in place thereon, supply further passages for the distribution of water throughout the system and retard run-off. This ply is also preferably siped on one or both surfaces since this feature facilitates flat lying of the ply on its foundation and eliminates any tendency to curl.

These and other features of our invention will be best understood and appreciated from the following description of a preferred system for carrying out our improved process, selected for purposes of illustration and shown in the accompanying drawings, in which:

FIG. 1 is a view in perspective of an elastomeric panel section of the system,

FIG. 2 is a fragmentary sectional view showing the section in operative relation in the system, FIG. 3 is a fragmentary sectional view suggesting an alternative siping pattern.

Figure 4:
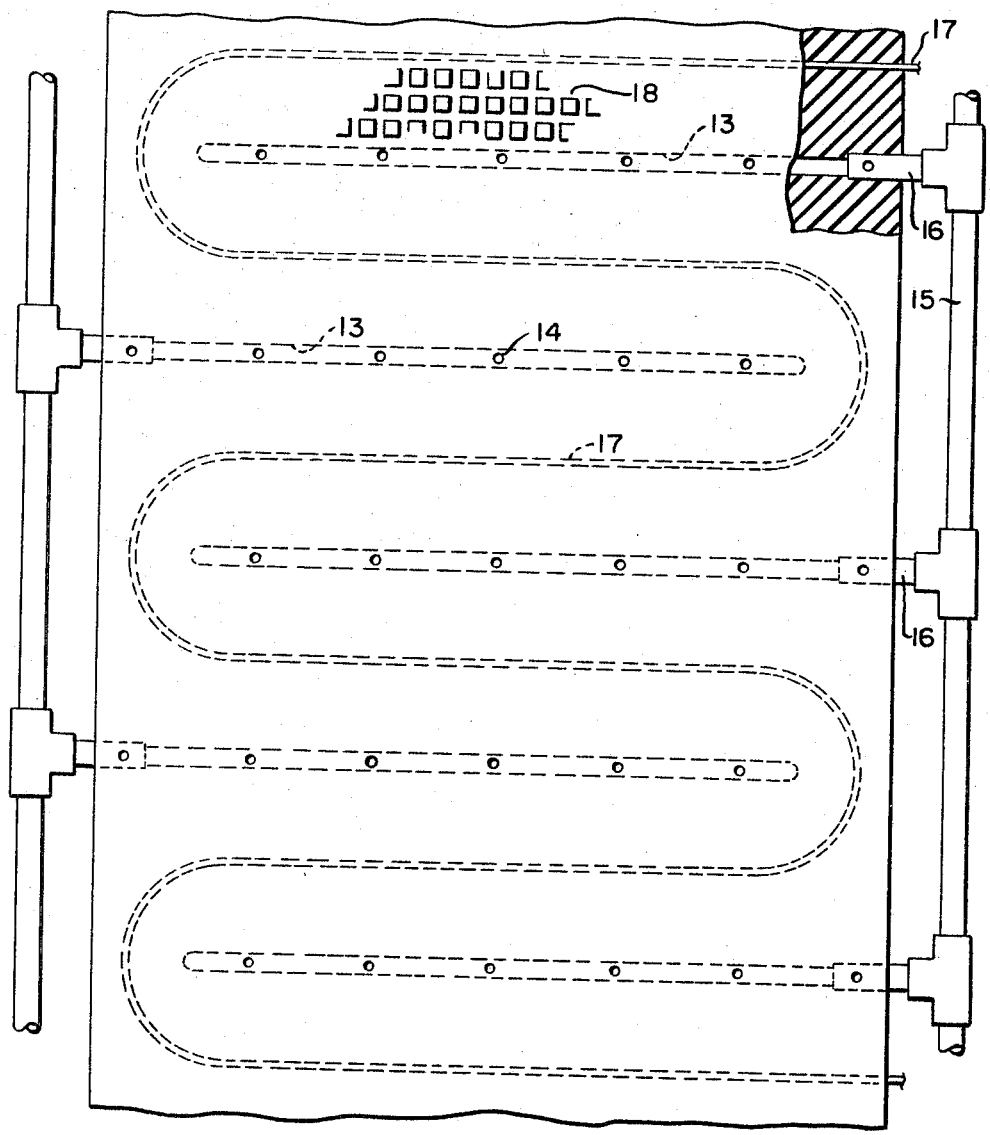
FIG. 4 is a plan view showing the panel section with its service connections.

The system may be conveniently assembled in an area of any desired extent from panel sections such as that depicted in the figures of the drawings. In FIGS. 2 and 3 a foundation 10 of concrete is suggested but this may be of clay, hardpan or other stable foundation material. It may be level or graded at a slight pitch as shown in FIG. 2, in order to guard against the formation of possible soggy spots.

In FIGS. 1 and 4 is shown, as an element of the elastomeric ply, a rectangular section or panel 12 which may be of any convenient dimensions, as 4 x 6 feet, and of a moldable rubber, vinyl or other equivalent elastomeric compound. A satisfactory formula for the panel sections is as follows:

| | |
|---|---|
| Butadiene-styrene copolymer | 100 |
| Carbon black | 50 |
| Zinc oxide | 5 |
| Stearic acid | 1 |
| Mineral oil | 5 |
| Sulfur | 2.50 |
| Mercapto-benzo-thiozole | 1 |
| Phenyl beta naphthylamine | 1.50 |
| | 166.00 |

Upon the molded panel 12 is spread a layer 11 of garden or top soil and this should be of a composition compatible to the crop in contemplation.

The panel section itself may be fashioned by molding or otherwise with a network of ducts or passages 13 and these, as shown in FIG. 4, open through opposite edge walls of the section. They extend in spaced parallel relation throughout its whole area. The passages 13 terminate in dead ends within the body of the section and have uniformly spaced upwardly directed perforations 14 for discharge into the supernatant top soil 11. The passages 13 may be formed by molding mandrels or tubes into the body of the panel section or by molding it in half sections to be cemented or vulcanized together. As herein shown the passages 13 are located midway between the upper and lower surfaces of the panel section of the elastomeric ply.

Water or other liquid is supplied to the passages 13 through pipe manifolds located at opposite sides of the panel. Each of these includes a supply header 15 having T's from which project nipples 16 that are forced into the open ends of the passages 13.

Electrical heating resistance wire 17 is molded into the body of the panel section and arranged in a serpentine path looped about the ends of the passages 13. By regulating the current supplied to this wire the whole panel section may be maintained uniformly at the desired temperature and the top soil correspondingly warmed.

The upper surface of the panel section is herein shown as partially covered with corrugations or shallow recesses 18. These are useful in holding the top soil layer in place and also in retarding run off of liquid from the system. Any pattern of surface roughness may be used that would have equivalent effect.

The panel section 12 is shown as having a herringbone pattern of siping cuts 19 in its upper surface in FIGS. 1 and 2, and in both surfaces in FIG. 3. This feature has been found desirable as facilitating the laying of the panel sections upon their underlying foundation and in preventing any tendency to curl in continued use.

It will be understood that the panel sections are laid side by side in edgewise contact upon their foundation and thus form an elastomeric ply of the desired area which is serviced from common sources of liquid and electric energy. It will be apparent that the molded panels may be heated by circulating hot liquid through the distributing ducts 13 with or without the assistance of the electrical heating circuits.

Having thus disclosed our invention and described in detail an illustrative embodiment thereof, we claim as new and desire to secure by Letters Patent:

1. A horticultural system comprising a layer of garden soil overlying a ply of elastomeric material which has an internal network of perforated ducts for distributing liquid to the overlying layer of soil and embedded electrical heating means therein for controlling the temperature of the overlying soil.

2. A horticultural system as described in claim 1, further characterized in that the ducts of the elastomeric ply take the form of cored passages leading from a side wall of the said ply.

3. A horticultural system as described in claim 1, further characterized in that the elastomeric ply has an upper soil-supporting surface which is recessed to retard run-off of liquid from the system.

4. A horticultural system as described in claim 1, further characterized in that the ducts of the elastomeric ply extend in parallel relation from opposite sides of the ply and have nipple connections with external pipe manifolds for the supply of liquid.

5. A horticultural system as described in claim 1, further characterized in that the elastomeric ply has at least one surface provided with a pattern of siping cuts.

6. A horticultural system as described in claim 1, further characterized in that the elastomeric ply contains an electrical resistance heating wire which is spaced from the said ducts and looped about the ends thereof within the said ply.

References Cited by the Examiner
UNITED STATES PATENTS 2,947,109  8/1960  Davis et al. _____ 47—1
3,106,801  10/1963  Risacher _____ 47—17

ABRAHAM G. STONE, *Primary Examiner.*

ROBERT E. BAGWILL, *Examiner.*